(12) United States Patent
Nishida et al.

(10) Patent No.: US 6,174,982 B1
(45) Date of Patent: *Jan. 16, 2001

(54) PROCESS FOR THE PREPARATION OF POLYSILANES

(75) Inventors: Ryoichi Nishida, Ikoma; Shinichi Kawasaki, Kyotanabe; Hiroaki Murase, Kyoto, all of (JP)

(73) Assignee: Osaka Gas Company Limited, Osaka (JP)

( * ) Notice: Under 35 U.S.C. 154(b), the term of this patent shall be extended for 0 days.

This patent is subject to a terminal disclaimer.

(21) Appl. No.: 09/331,441

(22) PCT Filed: Dec. 26, 1997

(86) PCT No.: PCT/JP97/04893

§ 371 Date: Jun. 22, 1999

§ 102(e) Date: Jun. 22, 1999

(87) PCT Pub. No.: WO98/29476

PCT Pub. Date: Jul. 9, 1998

(30) Foreign Application Priority Data

Dec. 27, 1996 (JP) .................................... 8-350461

(51) Int. Cl.$^7$ .................................... C08G 77/08
(52) U.S. Cl. .................... 528/14; 528/10; 556/430
(58) Field of Search .................. 528/10, 14; 556/430

(56) References Cited

U.S. PATENT DOCUMENTS

| | | | |
|---|---|---|---|
| 5,599,892 | * 2/1997 | Hayashida | 528/10 |
| 5,641,849 | * 6/1997 | Nishida et al. | 528/10 |
| 5,905,139 | * 5/1999 | Moril et al. | 528/491 |

FOREIGN PATENT DOCUMENTS 4-178430  6/1992 (JP).
7-316303  12/1995 (JP).

* cited by examiner

Primary Examiner—Margaret G. Moore
(74) Attorney, Agent, or Firm—Larson & Taylor PLC

(57) ABSTRACT

A method for producing polysilanes comprising subjecting a dihalosilane of the general formula

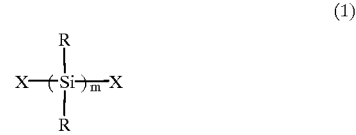

(1)

(wherein m is 1 to 3; R represents hydrogen atom, alkyl group, aryl group, alkoxy group, amino group or silyl group and two Rs are the same or different in case of m=1, four Rs are the same or at least two of them are different in case of m=2 and six Rs are the same or at least two of them are different in case of m=3; X represents halogen atom) to the action of Mg or Mg alloy in an aprotic solvent in the presence of Li salt and metal halide, thereby producing polysilane represented by the general formula

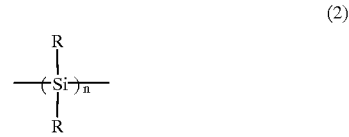

(2)

(wherein R is as defined above corresponding to the starting material; n is 2 to 1000).

10 Claims, No Drawings

PROCESS FOR THE PREPARATION OF POLYSILANES

TECHNICAL FIELD

The present invention relates to a process for the preparation of polysilanes.

BACKGROUND ART

Polysilanes are attracting attention for their use as ceramic precursors; optoelectric materials such as photoresist, organic photosensitive material, optical waveguide, and optical memory, etc.

Heretofore, a method for producing polysilane is known wherein dialkyldihalosilane or dihalotetraalkyldisilane dissolved in toluene is subjected to reductive coupling in the presence of alkali metals such as metallic sodium with thorough stirring at a temperature over 100° C. (J. Am. Chem. Soc., 103 (1981) 7352). This method, however, including the steps of heating, thoroughly stirring and dispersing alkali metal which is inflammable in the presence of air, has safety problems for industrial-scale production. Further, the quality of the polysilane produced by this method is unsatisfactory; its molecular-weight distribution is polymodal, for example.

To overcome these drawbacks, several new methods for producing polysilanes have been proposed, as described below.

(a) Anionic polymerization of disilenes masked by biphenyl or the like. (Japanese Unexamined Patent Publication No. 23063/1989).

(b) Ring-opening polymerization of cyclic silanes (Japanese Unexamined Patent Publication 170913/1993).

(c) Dehydrogenative polycondensation of hydrosilane in the presence of transition-metal complex catalyst (Japanese Unexamined Patent Publication No. 17753/1995).

(d) Electroreduction of dihalosilane at room temperature or lower temperatures (Japanese Unexamined Patent Publication 309953/1995).

However, the above methods (a) and (b) suffer from various defects: they require complicated processes for producing monomers, the total yield of monomer is low in synthesis, and there are safety concerns due to the alkyl lithium reagent employed in polymerization. The method (c) has yet to be improved in the molecular weight and the structure of resulting polysilane (e.g., formation of crosslinked structure) attributable to the reaction mechanism thereof.

The method (d), on the other hand, is an excellent technique for providing high-molecular-weight and high-quality polysilane safely and efficiently in a high yield. The method, however, requires a special reaction apparatus, i.e., electrolytic cell. Accordingly, the method is not suitable for producing polysilane for less valuable applications although very useful for producing polysilanes for highly valuable applications.

In view of the above, it is a principal object of the present invention to provide a new method for producing desired polysilanes without complicated operations, and safely and economically.

DISCLOSURE OF THE INVENTION

The inventors conducted extensive research and discovered that the prior art problems can be substantially obviated or significantly mitigated by placing halosilane under the action of Mg or Mg alloy in the presence of specific Li salt and specific metal halide.

The present invention provides a method for producing polysilanes as described below:

1. A method for producing polysilanes comprising subjecting a dihalosilane of the general formula

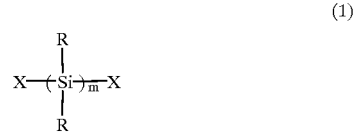

(1)

(wherein m is 1 to 3; R represents hydrogen atom, alkyl group, aryl group, alkoxy group, amino group or silyl group and two Rs are the same or different in case of m=1, four Rs are the same or at least two of them are different in case of m=2 and six Rs are the same or at least two of them are different in case of m=3; X represents halogen atom) to the action of Mg or Mg alloy in an aprotic solvent in the presence of Li salt and metal halide, thereby producing polysilane represented by the general formula

(2)

(wherein R is as defined above corresponding to the starting material; n is 2 to 1000).

2. The method for producing polysilane according to the item 1 above, wherein Li salt is LiCl.
3. The method for producing polysilane according to the item 1 or 2 above, wherein the metal halide is at least one member selected from the group consisting of $FeCl_2$, $FeCl_3$, $FeBr_2$, $FeBr_3$, $CuCl_2$, $AlCl_3$, $AlBr_3$, $ZnCl_2$, $SnCl_2$, $SnCl_4$, $COCl_2$, $VCl_2$, $TiCl_4$, $PdCl_2$, $SmCl_2$ and $SmI_2$.
4. The method for producing polysilane according to the item 3 above, wherein the metal halide is $FeCl_2$.
5. The method for producing polysilane according to the item 3 above, wherein the metal halide is $CUCl_2$.
6. The method for producing polysilane according to the item 3 above, wherein the metal halide is $ZnCl_2$.

In the present invention, the halosilane used as the starting material is a dihalosilane represented by the general formula

(1)

(wherein m is 1 to 3; R represents hydrogen atom, alkyl group, aryl group, alkoxy group, amino group or silyl group and two Rs may be the same or different in case of m=1, four Rs may be the same or at least two of them may be different in case of m=2 and six Rs may be the same or at least two of them may be different in case of m=3; X represents halogen atom).

The reaction product of the present invention is a polysilane of the general formula

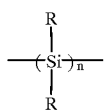

(2)

(wherein R is as defined above corresponding to the starting material; n is 2 to 1000).

In the dihalosilane represented by the general formula (1), m is 1 to 3, and hydrogen atom, amino group, organic substituents (alkyl group, aryl group, alkoxy group or amino group), and silyl group which are represented by R may be the same or at least two of them may be different. Stated more specifically, two Rs may be the same or different in case of m=1, four Rs may be the same or at least two of them may be different in case of m=2 and six Rs may be the same or at least two of them may be different in case of m=3.

Preferred compounds represented by the general formula (1) are those in which m is 1 or 2. Examples of the alkyl groups are those having 1 to 10 carbon atoms, among which those of 1 to 6 carbon atoms are preferable. Examples of the aryl groups include, phenyl group, phenyl group substituted with at least one alkyl group of 1 to 10 carbon atoms, p-alkoxyphenyl group, naphthyl group, etc. Examples of the alkoxy groups are those having 1 to 10 carbon atoms, among which those of 1 to 6 carbon atoms are preferred. Examples of the silyl groups are those having 1 to 10 silicon atoms, among which those of 1 to 6 silicon atoms are preferable. When Rs are above-mentioned amino group, organic substituents and silyl group, at least one of hydrogen atoms may be substituted with other functional group such as alkyl, aryl, or alkoxy group. Examples of the functional groups are those as stated above.

In the general formula (1), X represents a halogen atom (Cl, F, Br, I). Cl is more preferable as the halogen atom.

In the method of the present invention, dihalosilanes of the general formula (1) are usable singly or at least two of them can be used in mixture. Dihalosilanes of the highest purity are preferably used. For example, a liquid dihalosilane is preferably dried over calcium hydride and then distilled, and a solid dihalosilane is preferably purified by recrystallization.

Prior to the reaction, dihalosilane is dissolved in a solvent. Examples of useful solvents include a wide variety of aprotic solvents. Specific examples are polar solvents such as tetrahydrofuran, 1,2-dimethoxyethane, propylene carbonate, acetonitrile, dimethylformamide, dimethylsulfoxide, bis(2-methoxyethyl)ether, 1,4-dioxane, methylene chloride, etc.; non-polar solvents such as toluene, xylene, benzene, n-pentane, n-hexane, n-octane, n-decane, cyclohexane, etc. These solvents are usable singly or at least two of them can be used in mixture. Preferably, a single polar solvent, a mixture of at least two of polar solvent, and a mixture of polar solvent and non-polar solvent are used as the solvent. When a polar solvent and a non-polar solvent are used as a mixture, they are preferably in a proportion of the former:the latter=1 to 0.01–20. Preferred polar solvents to be used solely or in combination with other solvents are tetrahydrofuran and 1,2-dimethoxyethane.

Too low a concentration of dihalosilane in the solvent reduces polymerization efficiency. Contrarily, too high a concentration thereof may deteriorate the solubility of Li salt and metal halide to be used in the reaction. Accordingly, a suitable concentration of dihalosilane in the solvent is about 0.05 to about 20 mol/l, preferably about 0.2 to about 15 mol/l, more preferably about 0.3 to about 13 mol/l.

Examples of usable Li salt in the present invention are $LiCl$, $LiNO_3$, $Li_2CO_3$, $LiClO_4$, etc. These Li salts may be used singly, or at least two of them may be used in combination.

In case that the concentration of Li salt is too low, the reaction does not smoothly proceed. In case that the concentration is too high, an excessive amount of lithium is deposited by reduction, which leads to cleavage of Si—Si bonds in the main chain, thereby reducing the molecular weight of the desired polysilane. Hence the concentration of Li salt in the solvent is preferably about 0.05 to 5 mol/l, more preferably about 0.1 to 4 mol/l and most preferably about 0.15 to 3.0 mol/l.

The examples of the metal halide used in the present invention are $FeCl_2$, $FeCl_3$, $FeBr_2$, $FeBr_3$, $CuCl_2$, $AlCl_3$, $AlBr_3$, $ZnCl_2$, $SnCl_2$, $SnCl_4$, $COCl_2$, $VCl_2$, $TiCl_4$, $PdCl_2$, $SmCl_2$, $SmI_2$, etc. Among these metal halides, more preferred are $FeCl_2$, $ZnCl_2$, and $CuCl_2$. When the concentration of metal halide in the solvent is too low, the reaction does not proceed sufficiently. Contrarily, at too high a concentration, the metal halide fails to participate in the reaction. A suitable concentration of metal halide in the solvent is about 0.01 to 6 mol/l, more preferably about 0.02 to 4 mol/l, most preferably about 0.03 to 3 mol/l.

The configurations of Mg or Mg alloy used in the present invention are not limited insofar as the reaction can be successfully conducted. Examples of Mg or Mg alloy configurations are powder, granule, ribbon, chip, block, bar, plate, etc. Among the examples, those with a large surface area such as powder, granule, ribbon, and chip are preferable. The amount of Mg or Mg alloy is usually equal to or more than that of dihalosilane in mols (calculated as Mg), preferably three times or more, more preferably five times or more than the amount of dihalosilane in mols. Mg or Mg alloy reduces the dihalosilane represented by the general formula (1) into the polysilane represented by the general formula (2), while the Mg or Mg alloy per se is oxidized to form halogenated Mg.

The reaction in the present invention can be carried out, for example, by charging dihalosilane of the general formula (1), Li salt, metal halide and Mg (or Mg alloy) along with a solvent into a closed vessel as a reactor, preferably with stirring by mechanical or magnetic means. The shape and structure of the reactor vessel are not limited insofar as the vessel can be tightly closed.

The reactor vessel preferably has a dry atmosphere, more preferably an atmosphere of dry nitrogen or inert gas, most preferably an atmosphere consisting of deoxidized dry nitrogen or inert gas.

When the reaction mixture is stirred, the faster the stirring speed is, the shorter the reaction time for polymerization is, as in general chemical reactions. Stirring conditions vary depending on the types of reactors. For example, when using 100 ml-volume eggplant-type flask, the reaction proceeds more smoothly by stirring with a 10-mm-long or longer stirrer at the stirring speed of 20 rpm or more.

The reacting period depends on the amount of the materials such as dihalosilane, Li salt, metal halide, and Mg (and/or Mg alloy), and the stirring speed if stirring is required. It is at least about 30 minutes, normally about 1 to about 100 hours. Control over the reaction period enables the molecular weight regulation of polysilane.

The reaction temperature ranges usually from −20° C. to the boiling point of the solvent used, preferably about −10 to about 50° C., more preferably about −5 to about 35° C.

INDUSTRIAL APPLICABILITY

The present invention achieves the following remarkable effects:

(a) Polysilanes having a uniform molecular weight can be produced in a high yield and readily by using commercial materials and stirring the reactants at room temperature.

(b) Polysilanes can be produced safely without polluting the environment since the reaction process does not require the use of harmful reagents and severe reacting conditions.

(c) Polysilanes can be synthesized at a low cost since expensive reagents and special reaction equipments such as electrolytic cells are not used.

(d) Polysilanes having a desired molecular weight can be obtained simply by controlling the reaction period and/or stirring speed.

BEST MODE FOR CARRYING OUT THE INVENTION

The following examples are intended to illustrate the present invention in further detail.

EXAMPLE 1

Six grams of granular magnesium, 1.6 g of anhydrous lithium chloride (LiCl), and 0.96 g of anhydrous ferrous chloride ($FeCl_2$) were fed into a 100 ml-volume eggplant-type flask (reactor) equipped with a three-way cock. The flask was heated at 50° C. under the reduced pressure of 1 mmHg to dry the content of the flask. Dry argon gas was charged into the reactor. Then 60 ml of tetrahydrofuran preliminarily dried over sodium-benzophenone ketyl was added. The reaction mixture was stirred at room temperature about 30 minutes. To the mixture was added, with a syringe, 6.4 ml (40 mmol) of methylphenyldichlorosilane preliminarily purified by distillation, and the reactants were stirred at room temperature about 12 hours. After the completion of the reaction, the reaction solution was added to 50 ml of 1N hydrochloric acid, and extracted with 100 ml of ether. The ether layer was washed with 50 ml of pure water twice, and dried over anhydrous magnesium sulfate. The ether was removed by distillation therefrom to produce crude polysilane which included low-molecular-weight fractions. The crude polysilane was reprecipitated in 20 ml of good solvent tetrahydrofuran and 400 ml of poor solvent ethanol to afford a desired product.

Methylphenylpolysilane with a weight average molecular weight of 14500 (average degree of polymerization: approximately 121) was obtained in a yield of 47%.

EXAMPLE 2

A reaction was conducted in a similar manner as in Example 1 with the exception that 12 hours of the reaction period was shortened to 5 hours.

Methylphenylpolysilane with a weight average molecular weight of 6300 (average degree of polymerization: approximately 53) was obtained in a yield of 37.3%.

EXAMPLE 3

A reaction was conducted in a similar manner as in Example 1 with the exception that 12.0 g of Mg was used in place of 6.0 g of the same.

As the result, methylphenylpolysilane with a weight average molecular weight of 22800 (average degree of polymerization: approximately 190) was obtained in a yield of 56.4%.

EXAMPLE 4

A reaction was conducted in a similar manner as in Example 1 with the exception that 3.0 g of Mg was used in place of 6.0 g of the same, and the stirring period was 72 hours.

Methylphenylpolysilane with a weight average molecular weight of 17100 (average degree of polymerization: approximately 143) was obtained in a yield of 35.2%.

EXAMPLE 5

A reaction was conducted in a similar manner as in Example 1 with the exception that 6.6 g of Mg alloy (Mg=91%; Al=6%; Zn=3%) was used in place of Mg.

Methylphenylpolysilane with a weight average molecular weight of 13000 (average degree of polymerization: approximately 108) was obtained in a yield of 38.5%.

EXAMPLE 6

A reaction was conducted in a similar manner as in Example 1 with the exception that the amount of methylphenyldichlorosilane was 12.8 ml (80 mmol).

Methylphenylpolysilane with a weight average molecular weight of 24600 (average degree of polymerization: approximately 205) was obtained in a yield of 30.3%.

EXAMPLE 7

A reaction was conducted in a similar manner as in Example 1 with the exception that 3.2 ml (20 mmol) of methylphenyldichlorosilane was used.

Methylphenylpolysilane with a weight average molecular weight of 12900 (average degree of polymerization: approximately 108) was obtained in a yield of 50.7%.

EXAMPLE 8

A reaction was conducted in a similar manner as in Example 1 with the exception that 0.8 g of LiCl was used.

Methylphenylpolysilane with a weight average molecular weight of 16200 (average degree of polymerization: approximately 135) was obtained in a yield of 44.9%.

EXAMPLE 9

A reaction was conducted in a similar manner as in Example 1 with the exception that 3.2 g of LiCl was used.

Methylphenylpolysilane with a weight average molecular weight of 14300 (average degree of polymerization: approximately 119) was obtained in a yield of 36.5%.

EXAMPLE 10

A reaction was conducted in a similar manner as in the Example 1 with the exception that the amount of $FeCl_2$ used was 1.92 g.

Methylphenylpolysilane with a weight average molecular weight of 14000 (average degree of polymerization: approximately 117) was obtained in a yield of 42.1%.

EXAMPLE 11

A reaction was conducted in a similar manner as in the Example 1 with the exception that the amount of $FeCl_2$ used was 0.48 g.

Methylphenylpolysilane with a weight average molecular weight of 16400 (average degree of polymerization: approximately 137) was obtained in a yield of 51.0%.

EXAMPLE 12

A reaction was conducted in a similar manner as in the Example 1 with the exception that a mixed liquid of 45 ml of THF and 15 ml of toluene was used as solvent.

Methylphenylpolysilane with a weight average molecular weight of 13800 (average degree of polymerization: approximately 115) was obtained in a yield of 44.7%.

EXAMPLE 13

A reaction was conducted in a similar manner as in the Example 1 with the exception that a mixed liquid of 30 ml of THF and 30 ml of toluene was used as solvent.

Methylphenylpolysilane with a weight average molecular weight of 15100 (average degree of polymerization: approximately 126) was obtained in a yield of 42.2%.

EXAMPLE 14

A reaction was conducted in a similar manner as in the Example 1 with the exception that 60 ml of 1,2-dimethoxyethane was used as solvent.

Methylphenylpolysilane with a weight average molecular weight of 13600 (average degree of polymerization: approximately 113) was obtained in a yield of 40.4%.

EXAMPLE 15

A reaction was conducted in a similar manner as in the Example 1 with the exception that 8.76 g (40 mmol) of p-ethylphenylmethyldichlorosilane was used as monomer.

As the result, p-ethylphenylpolysilane with a weight average molecular weight of 15400 (average degree of polymerization: approximately 128) was obtained in a yield of 41.0%.

EXAMPLE 16

A reaction was conducted in a similar manner as in the Example 1 with the exception that 7.84 g (40 mmol) of cyclohexylmethyldichlorosilane was used as monomer.

Cyclohexylmethylpolysilane with a weight average molecular weight of 18200 (average degree of polymerization: approximately 152) was obtained in a yield of 38.9%.

EXAMPLE 17

A reaction was conducted in a similar manner as in the Example 1 with the exception that 3.82 g (20 mmol) of methylphenyldichlorosilane and 1.87 g (20 mmol) of dimethyldichlorosilane were used as monomers.

Methylphenyl-dimethyl copolymer polysilane with a weight average molecular weight of 11440 (average degree of polymerization: approximately 129) was obtained in a yield of 37.9%.

EXAMPLE 18

A reaction was conducted in a similar manner as in the Example 1 with the exception that 1.23 g of $FeCl_3$ was used as metal halide.

A polysilane having a high molecular weight was obtained in a high yield.

EXAMPLE 19

A reaction was conducted in a similar manner as in the Example 1 with the exception that 1.63 g of $FeBr_2$ was used as metal halide.

A polysilane having a high molecular weight was obtained in a high yield.

EXAMPLE 20

A reaction was conducted in a similar manner as in the Example 1 with the exception that 1.01 g of $AlCl_3$ was used as metal halide.

A polysilane having a high molecular weight was obtained in a high yield.

EXAMPLE 21

A reaction was conducted in a similar manner as in the Example 1 with the exception that 1.03 g of $ZnCl_2$ was used as metal halide.

A polysilane having a high molecular weight was obtained in a high yield.

EXAMPLE 22

A reaction was conducted in a similar manner as in the Example 1 with the exception that 1.44 g of $SnCl_2$ was used as metal halide.

A polysilane having a high molecular weight was obtained in a high yield.

EXAMPLE 23

A reaction was conducted in a similar manner as in the Example 1 with the exception that 0.98 g of $CoCl_2$ was used as metal halide.

A polysilane having a high molecular weight was obtained in a high yield.

EXAMPLE 24

A reaction was conducted in a similar manner as in the Example 1 with the exception that 0.92 g of $VCl_2$ was used as metal halide.

A polysilane having a high molecular weight was obtained in a high yield.

EXAMPLE 25

A reaction was conducted in a similar manner as in the Example 1 with the exception that 1.44 g of $TiCl_4$ was used as metal halide.

A polysilane having a high molecular weight was obtained in a high yield.

EXAMPLE 26

A reaction was conducted in a similar manner as in the Example 1 with the exception that 1.34 g of $PdCl_2$ was used as metal halide.

A polysilane having a high molecular weight was obtained in a high yield.

EXAMPLE 27

A reaction was conducted in a similar manner as in the Example 1 with the exception that 1.68 g of $SmCl_2$ was used as metal halide.

A polysilane having a high molecular weight was obtained in a high yield.

EXAMPLE 28

A reaction was conducted in a similar manner as in the Example 1 with the exception that 3.06 g of $SmI_2$ was used as metal halide.

A polysilane having a high molecular weight was obtained in a high yield.

COMPARATIVE EXAMPLE 1

6.8 g of granular aluminum, 1.6 g of anhydrous lithium chloride (LiCl), and 0.96 g of anhydrous ferrous chloride ($FeCl_2$) were fed into a 100 ml-volume eggplant-type flask (reactor) equipped with a three-way cock. The flask was heated at 50° C. under the reduced pressure of 1 mmHg to dry the content of the flask. Dry argon gas was charged into the reactor. Then 60 ml of tetrahydrofuran preliminarily dried over sodium-benzophenone ketyl was added thereto. The reaction mixture was stirred at room temperature about 30 minutes. To the mixture was added, with a syringe, 6.4 ml (40 mmol) of methylphenyldichlorosilane preliminarily purified by distillation and the reactants were stirred at room temperature about 12 hours. After the completion of the reaction, the reaction solution was added to 50 ml of 1N hydrochloric acid, and extracted with 100 ml of ether. The ether layer was washed with 50 ml of pure water twice, and dried over anhydrous magnesium sulfate. The ether was removed by distillation therefrom. The analysis of the resulting product showed that polysilane had not been produced.

COMPARATIVE EXAMPLE 2

Six grams of granular magnesium and 1.6 g of anhydrous lithium chloride (LiCl) were fed into a 100 ml-volume eggplant-type flask (reactor) equipped with a three-way cock. The flask was heated at 50° C. under the reduced pressure of 1 mmHg to dry the content of the flask. Dry argon gas was charged into the reactor. Then 60 ml of tetrahydrofuran preliminarily dried over sodium-benzophenone ketyl was added. The reaction mixture was stirred at room temperature about 30 minutes. To the mixture was added, with a syringe, 6.4 ml (40 mmol) of methylphenyldichlorosilane preliminarily purified by distillation, and the contents were stirred at room temperature about 12 hours. The analysis of the resulting product showed that polysilane had not been produced.

COMPARATIVE EXAMPLE 3

Six grams of granular magnesium and 0.96 g of anhydrous ferrous chloride ($FeCl_2$) were fed into a 100 ml-volume eggplant-type flask equipped with a three-way cock. The flask was heated at 50° C. under the reduced pressure of 1 mmHg to dry the content of the flask. Dry argon gas was charged into the reactor. Then 60 ml of tetrahydrofuran preliminarily dried over sodium-benzophenone ketyl was added. The reaction mixture was stirred at room temperature about 30 minutes. To the mixture was added, with a syringe, 6.4 ml (40 mmol) of methylphenyldichlorosilane preliminarily purified by distillation, and the contents were stirred at room temperature about 12 hours. The analysis of the resulting product showed that polysilane had not been produced.

EXAMPLE 29

Ten grams of granular magnesium, 2.66 g of anhydrous lithium chloride (LiCl), and 1.60 g of anhydrous ferrous chloride ($FeCl_2$) were fed into a 100 ml-volume eggplant-type flask (reactor) equipped with a three-way cock. The flask was heated at 50° C. under the reduced pressure of 1 mmHg to dry the content of the flask. Dry argon gas was charged into the reactor. Then 44.4 ml of tetrahydrofuran preliminarily dried over sodium-benzophenone ketyl was added. The reaction mixture was stirred at room temperature about 30 minutes. To the mixture was added, with a syringe, 12.7 g (66.6 mmol) of methylphenyldichlorosilane preliminarily purified by distillation, and the reactants were stirred at room temperature about 12 hours. The stirring was carried out using a magnetic stirrer (rotation speed: 1350 rpm) with a magnetic chip (7 mm in diameter, 30 mm in length) placed inside the reactor.

After the completion of the reaction, 100 ml of ether was added to the reaction solution for salting-out the most of soluble metal salt. Then the metal salt was removed from the reaction solution by filtration.

Subsequently, the ether layer was poured into 50 ml of 1N hydrochloric acid and extracted. The ether layer was washed with 50 ml of pure water twice, and dried over anhydrous magnesium sulfate. The ether was removed by distillation therefrom to obtain crude polysilane which included low-molecular-weight fractions. The crude polysilane was then reprecipitated in 20 ml of good solvent tetrahydrofuran and 400 ml of poor solvent ethanol to afford a desired product.

Methylphenylpolysilane with a weight average molecular weight of 18800 (average degree of polymerization: approximately 157) was obtained in a yield of 52%.

EXAMPLE 30

A reaction was conducted in a similar manner as in Example 29 with the exception that 1.72 g of anhydrous zinc chloride ($ZnCl_2$) was used as metal salt instead of anhydrous ferrous chloride.

Methylphenylpolysilane with a weight average molecular weight of 16600 (average degree of polymerization: approximately 138) was obtained in a yield of 51%.

EXAMPLE 31

A reaction was conducted in a similar manner as in Example 29 with the exception that 1.70 g of anhydrous copper chloride ($CuCl_2$) was used as metal salt, and the stirring period was 72 hours.

Methylphenylpolysilane with a weight average molecular weight of 17900 (average degree of polymerization: approximately 149) was obtained in a yield of 56%.

EXAMPLE 32

A reaction was conducted in a similar manner as in Example 30 with the exception that 12 hours of reaction period was shortened to 5 hours.

Methylphenylpolysilane with a weight average molecular weight of 6300 (average degree of polymerization: approximately 53) was obtained in a yield of 37.3%.

EXAMPLE 33

A reaction was conducted in a similar manner as in Example 30 with the exception that the rotation speed of the magnetic stirrer was 720 rpm instead of 1350 rpm.

Methylphenylpolysilane with a weight average molecular weight of 8300 (average degree of polymerization: approximately 69) was obtained in a yield of 33.1%.

EXAMPLE 34

A reaction was conducted in a similar manner as in Example 30 with the exception that 15 g of Mg was used instead of 10 g of the same, and the stirring period was 8 hours.

Methylphenylpolysilane with a weight average molecular weight of 14400 (average degree of polymerization: approximately 120) was obtained in a yield of 47.8%.

EXAMPLE 35

A reaction was conducted in a similar manner as in Example 30 with the exception that 5 g of Mg was used instead of 10 g of the same, and the stirring period was 72 hours.

Methylphenylpolysilane with a weight average molecular weight of 16000 (average degree of polymerization: approximately 133) was obtained in a yield of 35.2%.

EXAMPLE 36

A reaction was conducted in a similar manner as in Example 30 with the exception of using 13.2 g (66.6 mmol) of n-hexylmethyldichlorosilane in place of 12.7 g of methylphenyldichlorosilane as the starting material.

As the result, n-hexylmethylpolysilane with a weight average molecular weight of 13900 (average degree of polymerization: approximately 94) was obtained in a yield of 44.9%.

EXAMPLE 37

A reaction was conducted in a similar manner as in Example 30 with the exception that 12.7 g of methylphenyldichlorosilane was replaced by the mixture of 6.6 g (33.3 mmol) of n-hexylmethyldichlorosilane and 6.4 g (33.3 mmol) of methylphenyldichlorosilane as the starting material.

Thus, n-hexylmethyl-methylphenyl copolymer polysilane with a weight average molecular weight of 20700 (average degree of polymerization: approximately 169) was obtained in a yield of 41.9%.

EXAMPLE 38

A reaction was conducted in a similar manner as in Example 30 with the exception that 12.7 g of methylphenyldichlorosilane was replaced by the mixture of 6.5 g (33.3 mmol) of cyclohexylmethyldichlorosilane and 6.4 g (33.3 mmol) of methylphenyldichlorosilane as the starting material.

Cyclohexylmethyl-methylphenyl copolymer polysilane with a weight average molecular weight of 19100 (average degree of polymerization: approximately 155) was obtained in a yield of 49.0%.

What is claimed is:

1. A method for producing polysilanes comprising subjecting a dihalosilane of the general formula

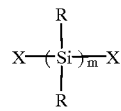
(1)

(wherein m is 1 to 3; R represents hydrogen atom, alkyl group, aryl group, alkoxy group, amino group or silyl group and two Rs are the same or different in case of m=1, four Rs are the same or at least two of them are different in case of m=2 and six Rs are the same or at least two of them are different in case of m=3; X represents halogen atom) to the action of Mg or Mg alloy in an aprotic solvent in the presence of Li salt and metal halide, thereby producing polysilane represented by the general formula

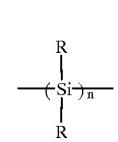
(2)

(wherein R is as defined above corresponding to the starting material; n is 2 to 1000).

2. The method for producing polysilane according to claim 1, wherein Li salt is LiCl.

3. The method for producing polysilane according to claim 1, wherein the metal halide is at least one member selected from the group consisting of $FeCl_2$, $FeCl_3$, $FeBr_2$, $FeBr_3$, $CuCl_2$, $AlCl_3$, $AlBr_3$, $ZnCl_2$, $SnCl_2$, $SnCl_4$, $CoCl_2$, $VCl_2$, $TiCl_4$, $PdCl_2$, $SmCl_2$ and $SmI_2$.

4. The method for producing polysilane according to claim 3, wherein the metal halide is $FeCl_2$.

5. The method for producing polysilane according to claim 3, wherein the metal halide is $CuCl_2$.

6. The method for producing polysilane according to claim 3, wherein the metal halide is $ZnCl_2$.

7. The method for producing polysilane according to claim 2, wherein the metal halide is at least one member selected from the group consisting of $FeCl_2$, $FeCl_3$, $FeBr_2$, $FeBr_3$, $CuCl_2$, $AlCl_3$, $AlBr_3$, $ZnCl_2$, $SnCl_2$, $SnCl_4$, $CoCl_2$, $VCl_2$, $TiCl_4$, $PdCl_2$, $SmCl_2$ and $SmI_2$.

8. The method for producing polysilane according to claim 7, wherein the metal halide is $FeCl_2$.

9. The method for producing polysilane according to claim 7, wherein the metal halide is $CuCl_2$.

10. The method for producing polysilane according to claim 7, wherein the metal halide is $ZnCl_2$.

* * * * *